US011408564B2

(12) United States Patent
Kronholz et al.

(10) Patent No.: US 11,408,564 B2
(45) Date of Patent: Aug. 9, 2022

(54) SELF-SEALING VALVE CONNECTION FOR PRESSURE VESSELS

(71) Applicant: NPROXX B.V., Rk Heerlen (NL)

(72) Inventors: Stephan Kronholz, Julich (DE); Edwin Zimmermann, Stolberg (DE); Wilhelm Krath, Langerwehe (DE); Josef Mulheims, Julich (DE)

(73) Assignee: NPROXX B.V., Rk Heerlen (DE)

( * ) Notice: Subject to any disclaimer, the term of this patent is extended or adjusted under 35 U.S.C. 154(b) by 49 days.

(21) Appl. No.: 17/254,626

(22) PCT Filed: Jun. 19, 2019

(86) PCT No.: PCT/EP2019/066180
§ 371 (c)(1),
(2) Date: Dec. 21, 2020

(87) PCT Pub. No.: WO2019/243413
PCT Pub. Date: Dec. 26, 2019

(65) Prior Publication Data
US 2021/0123568 A1    Apr. 29, 2021

(30) Foreign Application Priority Data

Jun. 22, 2018   (EP) ..................... 18179194

(51) Int. Cl.
*F17C 13/04*   (2006.01)
*F17C 1/06*    (2006.01)
*F17C 1/16*    (2006.01)

(52) U.S. Cl.
CPC ............... *F17C 13/04* (2013.01); *F17C 1/06* (2013.01); *F17C 1/16* (2013.01);
(Continued)

(58) Field of Classification Search
CPC ...... F17C 1/06; F17C 1/16; F17C 2201/0109; F17C 2203/011; F17C 2203/0604;
(Continued)

(56) References Cited

U.S. PATENT DOCUMENTS

| 2009/0200757 A1* | 8/2009 | Lindner ................. F16J 15/062 277/650 |
| 2015/0292679 A1* | 10/2015 | Ehgartner ............... F17C 13/06 220/86.1 |

(Continued)

FOREIGN PATENT DOCUMENTS

| DE | 19751411 C1 | 1/1999 |
| DE | 102009008051 | 9/2009 |

*Primary Examiner* — Valentin Neacsu
*Assistant Examiner* — Laura E. Parker
(74) *Attorney, Agent, or Firm* — Tarolli, Sundheim, Covell & Tummino LLP (57) ABSTRACT

A pressure vessel is disclosed having an inner vessel made of an inner-vessel material and an outer layer applied thereon as well as a valve-connection piece with a two-part sealing cone and outer piece, the sealing cone being positioned on an inner face of a protrusion of the inner vessel and the outer piece for generating a sealing pressure being positioned between the two-part sealing cone, the protrusion and the outer piece on an outer face of the protrusion. The outer piece includes a suitably shaped groove having a first and a second edge for receiving a sealing ring that seals under the sealing pressure, wherein the groove and the sealing ring are dimensioned such that, under the sealing pressure and due to the plastic deformability, first and second sealing beads project at least into two gaps between the sealing ring and form the first and second edge.

15 Claims, 4 Drawing Sheets

(52) U.S. Cl.
CPC . *F17C 2201/0109* (2013.01); *F17C 2203/011* (2013.01); *F17C 2203/0604* (2013.01); *F17C 2203/066* (2013.01); *F17C 2203/0619* (2013.01); *F17C 2203/0663* (2013.01); *F17C 2203/0685* (2013.01); *F17C 2205/0305* (2013.01); *F17C 2205/0323* (2013.01); *F17C 2205/0394* (2013.01); *F17C 2221/012* (2013.01); *F17C 2223/0123* (2013.01); *F17C 2260/036* (2013.01); *F17C 2270/0168* (2013.01)

(58) Field of Classification Search
CPC ........ F17C 2203/0619; F17C 2203/066; F17C 2203/0663; F17C 2203/0685; F17C 2205/0394; F17C 2221/012; F17C 2223/0123; F17C 2270/0168; F17C 13/04; F17C 2205/0305; F17C 2205/0323; F17C 2360/036
USPC .................................................. 220/581, 589
See application file for complete search history.

(56) References Cited

U.S. PATENT DOCUMENTS

2018/0122437 A1\* 5/2018 Luo ........................ G11C 7/12
2018/0163927 A1   6/2018 Kanezaki \* cited by examiner

SELF-SEALING VALVE CONNECTION FOR PRESSURE VESSELS

RELATED APPLICATIONS

The present invention is a U.S. National Stage under 35 USC 371 patent application, claiming priority to Serial No. PCT/EP2019/066180, filed on 19 Jun. 2019; which claims priority of EP 18179194.8, filed on 22 Jun. 2018, the entirety of both of which are incorporated herein by reference.

FIELD OF THE INVENTION

The invention relates to a pressure vessel with a self-sealing valve-connection piece and a method of producing such a pressure vessel.

BACKGROUND OF THE INVENTION

The market for pressure vessels reinforced with fibre composite material grows continually. The increasing production of natural gas and fracking gas makes storage in pressure vessels indispensable, especially in countries without a corresponding pipeline network. In addition, there is the automotive sector, where the development of fuel cell vehicles is greatly promoted in which the fuel, in the form of gaseous hydrogen, is to be stored at high pressure in pressure vessels. For transporting the pressure vessels, lightweight vessels are desired since the transport of pressure vessels with high weight consumes an unnecessarily high amount of energy, leading to excessive transport costs.

For this purpose, the pressure vessels must be reliably sealed, for a filling gas stored at high pressure in the pressure vessel over a large temperature range and a long period of time, under alternating load conditions (evacuation of the pressure vessel, refilling of the vessel and so on), in accordance with the standard and/or customer requirements. In pressure vessels according to the state of the art, gas-tightness is aimed at by means of O ring seals. There is no redundancy for the place to be sealed, which may easily lead to failure of the seal if the fitting conditions of the O ring in relation to the other components change.

It is therefore desirable to have a valve connection for pressure vessels which is self-sealing and guarantees permanent and reliable sealing of the valve connection with respect to the inner vessel.

SUMMARY OF THE INVENTION

It is an object of the present invention to provide a pressure vessel with a valve connection which is self-sealing and guarantees permanent and reliable sealing of the valve connection with respect to the inner vessel.

This object is achieved by a pressure vessel comprising an inner vessel that has an inner and an outer face and is made of an inner-vessel material that is at least partially plastically deformable under pressure for providing a storage volume in the pressure vessel, an outer layer applied on the inner vessel for the reinforcement thereof, and a valve-connection piece arranged on the inner vessel having a two-part, hollow sealing cone and an outer piece for receiving a valve and for sealing the storage volume from the inner vessel, the inner vessel comprising, for connecting the valve-connection piece, a protrusion that is inwardly open towards the storage volume and projects cylindrically from the outer face, the two-part sealing cone being positioned on an inner face of the protrusion and the outer piece for generating a sealing pressure between the two-part sealing cone, the protrusion and the outer piece on an outer face of the protrusion, the outer piece comprising, on the face thereof oriented towards the protrusion, a suitably shaped groove having a first edge facing the storage volume and a second edge provided in the opposite direction for receiving a sealing ring that seals under the sealing pressure, the groove and the sealing ring being dimensioned and the inner-vessel material being provided such that, under the sealing pressure and due to the plastic deformability thereof, first and second sealing beads that project at least into two gaps between the sealing ring and the first and second edge are formed, and the two-part sealing cone comprises a hollow outer sleeve having a smallest internal diameter, an external diameter adapted to the protrusion and an inner face that is at least locally concave towards the protrusion, and comprises a hollow inner clamping cone having a largest external diameter that is smaller than an internal diameter of the protrusion and larger than the smallest internal diameter of the sleeve and an outer face that at least locally projects towards the protrusion, wherein the sleeve is positioned on the inner face of the protrusion from outside and the projecting outer face of the clamping cone is positioned from inside with the aid of a positioning aid so as to engage in the concave inner face of the sleeve such that the inner clamping cone is brought into an interference fit with the sleeve.

The inner vessel can be made of one piece or of multiple pieces. It can comprise merely two pole caps, one or two of which may comprise a cylindrical edge portion. If the inner vessel consists of multiple pieces, the edges of the pole caps are caused to be in direct contact and suitably interconnected. Alternatively, the inner vessel can also comprise, in addition to the pole caps, a cylindrical central portion which is preferably made of the same material as the pole caps. A cylinder axis of the inner vessel, or the pressure vessel, respectively, corresponds to the axis of symmetry of any cylindrical portion of the inner vessel, if present, or, if the inner vessel is only formed by two pole caps, the axis between the central points of the respective pole caps which also correspond to the highest points of the respective domes formed by the pole caps.

The plastically deformable inner-vessel material is, on the one hand, firm and stable in itself, but also has a certain fluidity so that at least its surface can plastically deform under high pressure and is therefore able to adapt to the contour of the pressing surfaces, but without the forming of large deformations. The inner vessel also has the function of providing a gas-tight storage volume for storing filling gas in the pressure vessel, so that the inner-vessel material should be gas-tight and should be, for instance, metal or plastic, in case of plastic, preferably PA or PE, as an individual layer or a multi-layer system. The filling gas can be any gas, for example hydrogen. The outer layer provides the pressure vessel with mechanical stability; that is, the outer layer provides the functionality of compression strength and the inner vessel of impermeability to gas. The outer layer can be, for instance, a fibre composite layer wound onto the inner vessel or applied on it by other techniques.

The sealing ring positioned in the groove does not completely fill the groove in the outer piece but leaves gaps in the groove on both sides towards the interior of the outer piece; a first and a second gap which are used to provide redundancy of the sealing effect. The construction of the components of the valve-connection piece and of the protrusion of the inner vessel, in combination with the adequate fluidity of the inner-vessel material and the consequent formation of the sealing beads, ensures that the pressure vessel provides an improved sealing effect and at the same time secure positioning of the components of the valve-connection piece in the pressure vessel. Also, in case of a change of pressure, the sealing ring remains permanently stable in the groove due to the two sealing beads. This sealing concept provides a triple redundancy for sealing the storage volume by means of triple sealing ensured serially by the (i) first sealing bead of the protrusion, acting against the outer piece, (ii) sealing cone, acting via protrusion on the sealing ring, and (iii) second sealing bead of the protrusion, acting against the outer piece, thus greatly improving on reliability and permanence of the sealing. Due to the formation of the sealing beads, caused by the sealing pressure exerted by the valve-connection piece, the valve-connection piece is additionally self-sealing. The sealing concept is independent of the material of the two-part sealing cone and of the connection piece; although the materials forming the two-part sealing cone and the connection piece have at least a lower fluidity than the inner-vessel material.

By positioning of the clamping cone in the curvature of the sleeve, sliding of the cone in relation to the sleeve is prevented. The specified exterior and interior diameters of the sleeve and of the clamping cone in relation to each other and in relation to the dome of the pole cap make it possible to apply this sealing concept also to one-part inner vessels; but naturally, multi-part inner vessels can be reliably sealed with this sealing concept as well. In case of a one-part inner vessel, before the sleeve is fitted, first the clamping cone is held by means of a positioning aid, for instance a rod with a strutting end, below the clamping cone in the storage volume or with a thread inside the clamping cone, and then the sleeve is inserted into the protrusion from the outside. Now the clamping cone is drawn into the sleeve from the inside by means of the positioning aid, sleeve and protrusion being slightly stretched so that the inner face of the sleeve and the outer face of the clamping cone form a tight fit. In multi-part inner vessels, the positioning aid can be omitted since the protrusion is freely accessible from the inside and therefore the clamping cone can be simply slid from there into the sleeve. "Locally convex" and "locally concave", respectively, are terms to designate convexities or concavities, respectively, which may extend over the entire inner face of the sleeve or the outer face of the clamping cone but may also designate local convexities or concavities of parts of the respective faces. Outer piece, sleeve and clamping cone can consist of any material suitable for this purpose, for instance, metal or plastic.

Due to the sealing concept according to the invention, the specified pressure vessel has a very flexible construction such that customer-specific valve-connection pieces are easy to adapt by respective shaping of the protrusion and the two-part sealing cone. Additionally, a supplementary sleeve can be integrated for the integration of sensor systems, sensors or other components extending into the pressure vessel.

The pressure vessel according to the invention therefore is a pressure vessel with a valve connection which is self-sealing and ensures permanent and reliable sealing of the valve connection with respect to the inner vessel.

In one embodiment, the inner vessel is produced in one piece. The sealing concept described above can be very well applied to one-part inner vessels, since the final sealing means, the inner clamping cone, is dimensioned such as to fit through the opening to be sealed and can therefore be brought into the necessary position with the aid of a suitable positioning aid without requiring access to the inner vessel from the rear or the inside in addition to the necessary opening for filling and evacuation of the pressure vessel, which is already there, through the protrusion.

In another embodiment, the sleeve is formed such that it comprises a stop facing an upper face of the protrusion and/or at least partially rests on an inner face of the outer piece extending at least over the sleeve and the protrusion. In this manner, the sleeve cannot slide into the storage volume and/or slide out of the opening of the protrusion along its inner face, for instance if the clamping cone is positioned from the inside.

In another embodiment, the sleeve is dimensioned such that the inner-vessel material forms, due to its plastic deformability, a third bead around the sleeve on its lower face directed towards the storage volume. This prevents displacement of the sleeve in the direction of the storage volume. The sealing pressure on the sealing ring is maintained as originally set. Also, the sleeve and the clamping cone anchored to it according to the invention cannot slide or fall into the storage volume in case of concussion of the pressure vessel.

In another embodiment, the two-part sealing cone or the outer piece are formed such that there is an open gas connection towards the storage volume between the storage volume and an upper face of the protrusion. In this way, the interior pressure inside the storage volume is also applied at the top of the protrusion of the inner vessel. The gas connection can be provided, for instance, by means of suitable channels, recesses or grooves in the sleeve and/or the clamping cone.

In another embodiment, the sleeve comprises an outer face facing the protrusion, the surface area of the outer face of the sleeve resting on the protrusion and/or the outer face of the clamping cone resting on the sleeve being smaller than those of the respective inner faces. Due to the different area ratios of the inner face and the outer face, with a gas connection between the storage volume and the upper face of the protrusion, the sealing pressure is additionally increased by the interior pressure in the storage volume of the pressure vessel, and, in case of a pressure rise in the storage volume (for instance during filling of the storage volume with gas, e. g. up to 500 bar), the sealing cone is additionally pressed in the direction of the outer piece, further improving the sealing effect and its reliability.

In another embodiment, the groove (or recess) has a contour which is adapted to a shape of the sealing ring in the unloaded state. In this way, no undefined hollow spaces can form behind the sealing ring, further improving the sealing effect of the sealing ring.

In another embodiment, the sealing ring is an O ring. O rings have, on the one hand, reliable sealing properties, and on the other hand, it is also easiest for them to form suitable contours in the groove. For this purpose, the curvature of the groove is adapted to the curvature of the surface of the O ring. The sealing ring, that is, in this case, the O ring, can consist of all materials suitable for gas sealing.

In another embodiment, the inner vessel material, at least for the protrusion, is a PA material, a PE material or a multi-layered material made of these materials. These materials have suitable properties for manufacturing the inner vessel and additionally provide suitable fluidity for forming the sealing beads, ensuring the additional sealing effect together with secure positioning of the components of the connection piece in the pressure vessel. The inner vessel can also consist entirely of these materials. The above materials are also suitable for being welded together for manufacturing from the components pole caps and, if desired, a central portion of an inner vessel for providing the storage volume.

In another embodiment, the valve-connection piece comprises an additional securing element which interconnects the two-part sealing cone and the outer piece. This helps to prevent displacement of the two-part sealing cone, i. e. of the sleeve and the clamping cone, in relation to the outer piece, in particular in the direction of the outer piece.

In another embodiment, the securing element is mounted in the outer piece and comprises a thread, at least on its side facing the sealing cone, which thread is provided for engagement in the inner face of the sealing cone. The securing element can be, for instance, a hollow screw or an accordingly shaped ring with through openings for exerting pressure on the upper face of the protrusion of the inner vessel.

In another embodiment, the outer piece of the valve-connection piece comprises connection means for receiving the valve in a pressure-stable manner. For instance, a valve can be screwed in a pressure-stable manner into a corresponding thread as a connecting means of the outer piece.

The invention furthermore relates to a method for producing a pressure vessel according to the invention, comprising an inner vessel that has an inner and an outer face and is made of an inner-vessel material that is at least partially plastically deformable under pressure, designed for receiving a valve, an outer layer positioned on the inner vessel and a valve-connection piece having a two-part sealing cone consisting of a hollow outer sleeve and a hollow inner clamping cone as well as an outer piece, comprising the following steps:

providing the inner vessel with a storage volume and a protrusion that is inwardly open and projects cylindrically from the outer face of the inner vessel; positioning the clamping cone having a largest external diameter that is smaller than an internal diameter of the protrusion and a largest external diameter that is larger than the smallest internal diameter of the sleeve towards the protrusion by means of a positioning aid, through the protrusion, in the storage volume of the inner vessel; inserting the hollow sleeve of the sealing cone from outside into a tight fit on the inner face of the protrusion, the sleeve having a smallest internal diameter and an external diameter adapted to the protrusion, while the positioning aid and the clamping cone are not influenced thereby; fitting the outer piece onto the outer face of the protrusion, the outer piece comprising, on its face oriented towards the protrusion, a suitably shaped groove having a first edge facing the future storage volume and a second edge provided in the opposite direction, and a sealing ring that is positioned in the groove and seals under a sealing pressure; positioning the clamping cone by means of the positioning aid from inside in the sleeve, the outer face of the clamping cone engaging in the inner face of the sleeve to form an interference fit with the sleeve, such that a sealing pressure is produced between the two-part sealing cone, the protrusion and the outer piece; forming at least first and second sealing beads, which, under the sealing pressure and with an accordingly dimensioned groove and sealing ring, project into two gaps between the sealing ring and the first and second edge due to the plastic deformability of the inner-vessel material in order to seal the storage volume from the future inner vessel; producing the outer layer on the inner vessel in order to reinforce the pressure vessel; and fitting the valve into the valve-connection piece in order to close the pressure vessel. The outer layer can be, for example, a fibre composite layer which is wound or applied by other techniques on the inner vessel.

The method according to the invention thus provides a pressure vessel with a valve connection which is self-sealing and ensures permanent and reliable sealing of the valve connection with respect to the inner vessel.

In one embodiment of the method, the method comprises the additional step of forming a third bead around the sealing cone on its lower face directed towards the storage volume due to the plastic deformability of the inner-vessel material.

In another embodiment of the method, the outer layer consists of fibre composite material and is wound onto the inner vessel in the producing step. Since the inner vessel itself forms the winding mandrel for the outer layer, the outer layer is formed so as to accurately fit the respective inner vessel.

In another embodiment of the method, the valve is fitted by being screwed on. For this purpose, the outer piece can already have an accordingly provided thread, or the valve has a thread that cuts itself into the outer piece.

In another embodiment of the method, the sleeve is inserted onto an upper face of the protrusion up to a stop of the sleeve and/or the outer piece is fitted to the sleeve and/or to the clamping cone until it comes in contact with an inner face of the outer piece. In this manner, sleeve and/or clamping cone are fixed in position by the outer piece such that they cannot slide to the outside along the inner face of the protrusion, which might change the sealing pressure and consequently the sealing effect.

In another embodiment of the method, the inner vessel is produced in one piece, for example as a blow-molded part or by injection molding. The production in one piece avoids additional process steps such as the joining of pole caps and of a central portion, if applicable. The production in one piece also avoids joining errors in the transition from a pole cap to the central portion, which might be the cause of gas leakage. By being made in one piece, the inner vessel is also mechanically more robust than an inner vessel where several components are joined.

The embodiments described above can be implemented in all possible combinations within the framework of the present invention.

SHORT DESCRIPTION OF FIGURES

These and other aspects of the invention are shown in detail in the figures as follows.

DETAILED DESCRIPTION OF EMBODIMENTS

Figure 1:
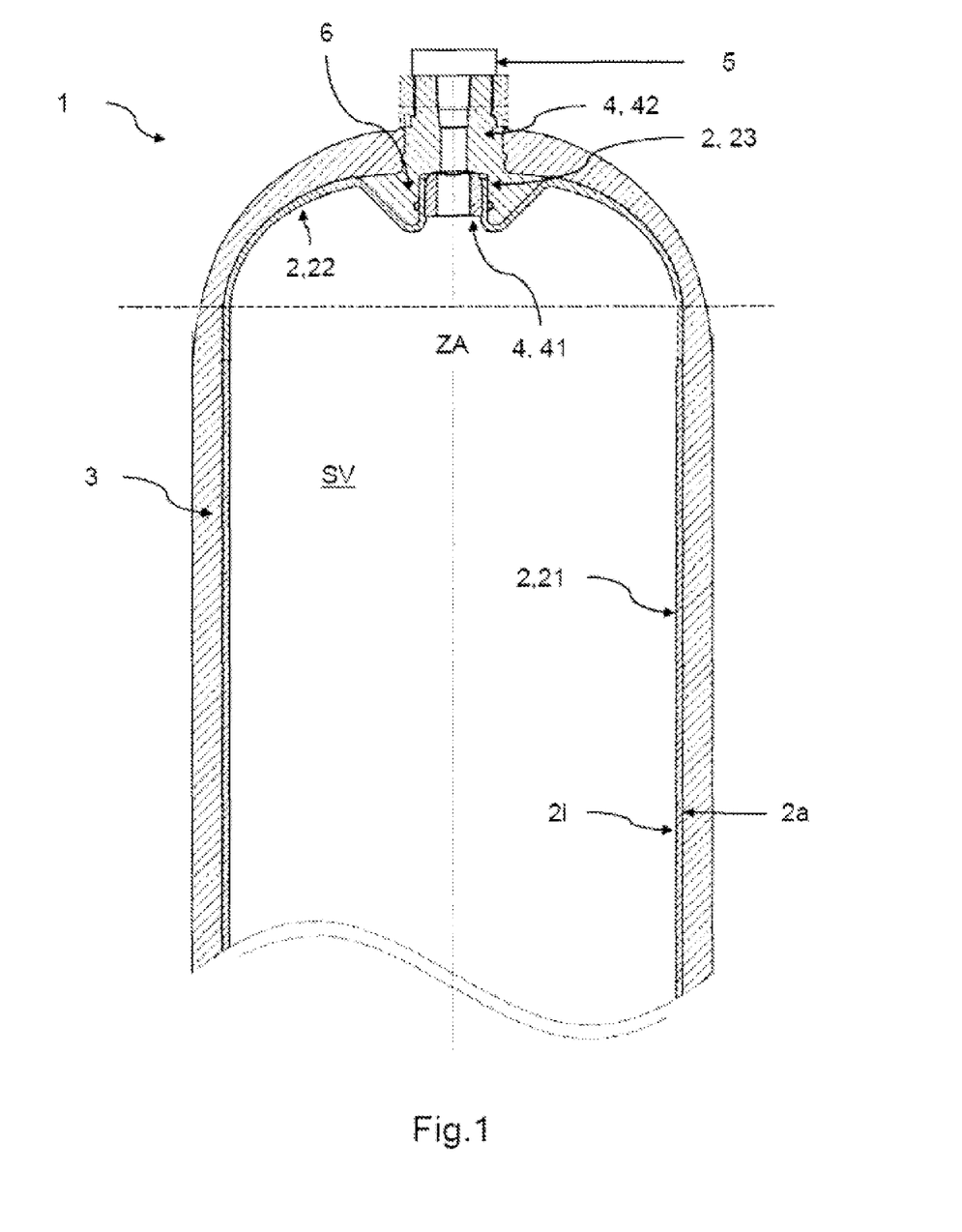
FIG. 1: an embodiment of the pressure vessel according to the invention in lateral section.

FIG. 1 shows an embodiment of the pressure vessel 1 according to the invention in lateral section, comprising a one-part inner vessel 2 that has an inner and an outer face 2$i$, 2$a$ and is made of an inner-vessel material that is at least partially plastically deformable under pressure, here having a cylindrical central portion 21 with a cylinder axis ZA and two pole caps 22 bordering on the cylindrical central portion 21 for providing a storage volume SV in the pressure vessel. For better comprehensibility, only half of the pressure vessel 1 is shown. The opposite pole cap 22, which is not shown here, for closing the central portion 21 on the other side, may not comprise a protrusion 23 but instead a continuous closed contour or corresponds to the pole cap 22 as shown with its own sealable opening or a corresponding valve-connection piece. Of course, the inner vessel 2 may only consist of the two pole caps 22, without the cylindrical central portion 21 shown here. For such an inner vessel, all embodiments of the invention as shown in FIGS. 1-4 apply analogously. The inner-vessel material can be any plastically deformable material. Preferably, the inner-vessel material is a PA, PE or multi-layered material made of the former, at least for the protrusion 23. An outer layer 3 is applied on the inner vessel 2 for reinforcement. A valve-connection piece 4 with a two-part sealing cone 41 and an outer piece 42 with a sealing ring 6 is arranged on the pole cap 22 for receiving a valve 5 and for sealing the storage volume with respect to the inner vessel 2 so that the pressure vessel can be filled with gas and so that the latter can at a later time be discharged from the storage volume SV. For this purpose, the inner vessel 2 cylindrically protrudes from the outer face 2a of the pole cap 22 in the form of a protrusion 23, providing a connection which is open at the interior towards the storage volume SV. This connection will then be closed by the valve 5 and reopened, if desired. The outer piece 42 of the valve-connection piece 4 may comprise connecting means for receiving the valve 5 in a pressure-stable manner. For details on the outer piece 42, two-part sealing cone 41, protrusion 23 and the formed sealing beads 24a, 24b, 24c, we refer to FIGS. 2 and 3.

Figure 2:
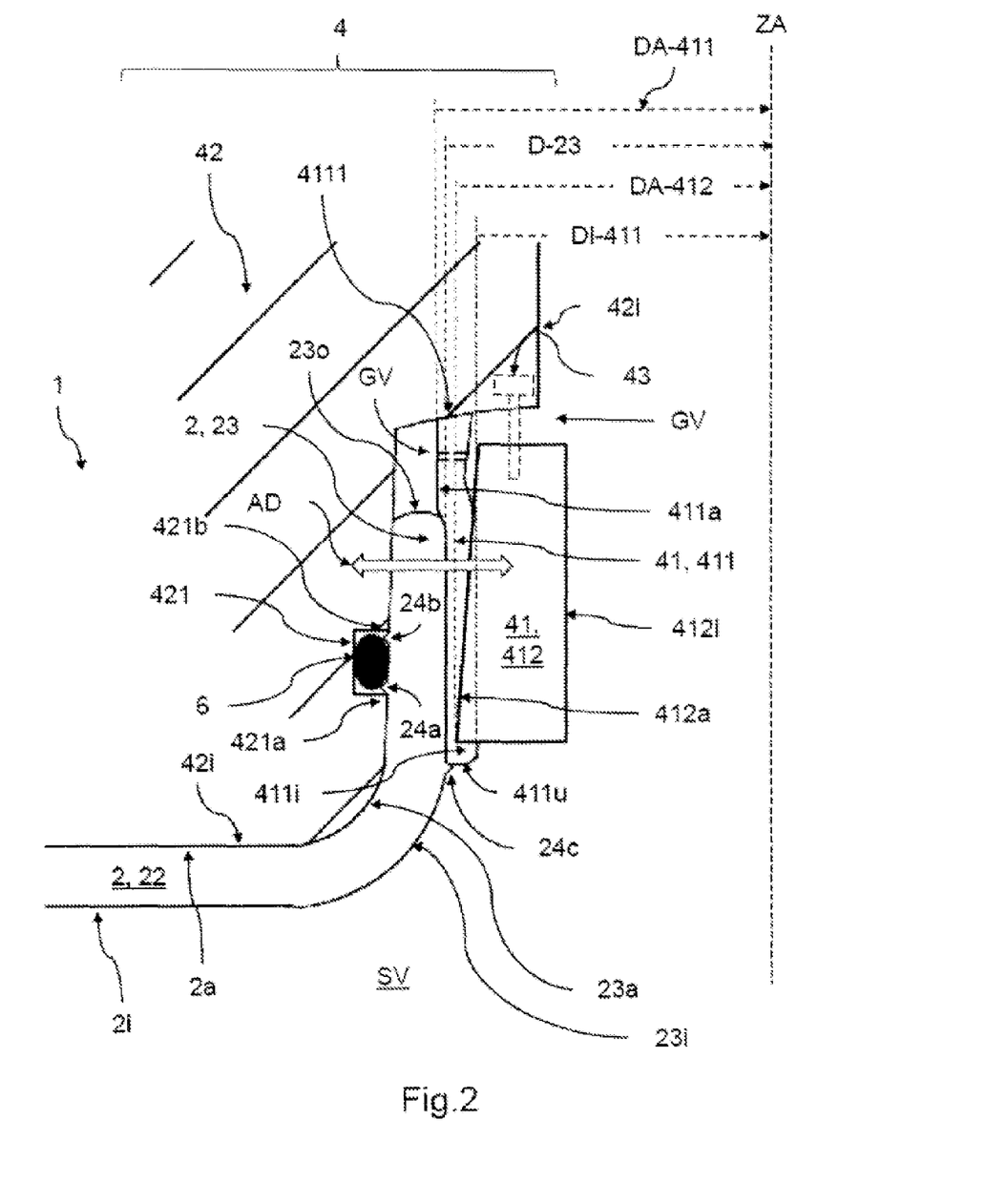
FIG. 2: the pressure vessel of FIG. 1 shown in an enlarged sectional view of the valve-connection piece and the protrusion of the inner vessel.
Figure 3:
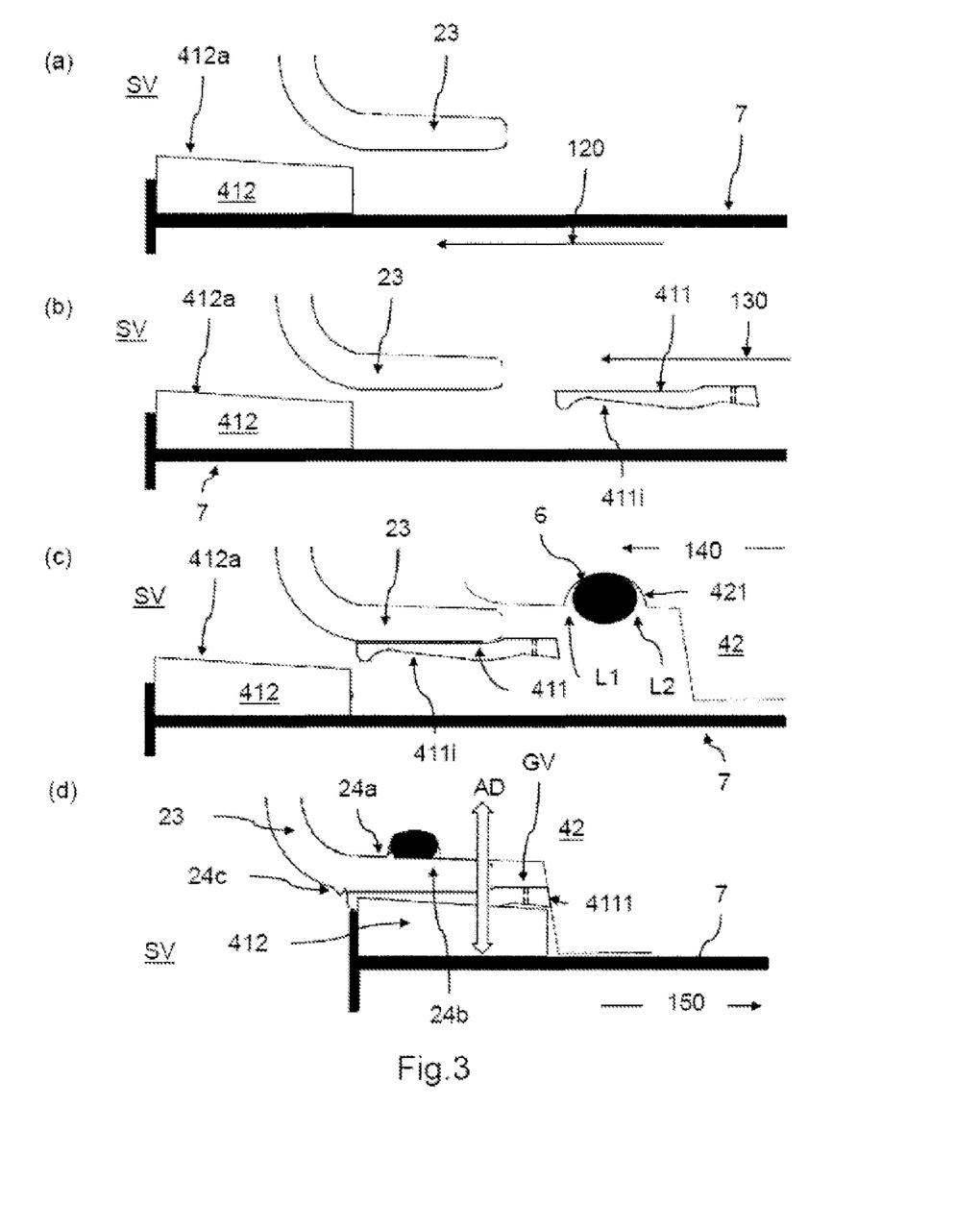
FIG. 3: schematic presentation of the sealing concept according to the invention with outer piece, protrusion of the inner vessel, two-part sealing cone and the formed sealing beads.

FIG. 2 shows the pressure vessel 1 shown in FIG. 1 in an enlarged sectional view of the valve-connection piece 4 with two-part sealing cone 41, outer piece 42 and protrusion 23 of the pole cap 22 of the inner vessel 2 along the cylinder axis ZA. The two-part sealing cone 41 with sleeve 411 and clamping cone 412 is positioned on the inner face 23i of the protrusion 23 and the outer piece 42 on the outer face 23a of the protrusion 23 for generating a sealing pressure AD between the sealing cone 41, the protrusion 23 and the outer piece 42. The outer piece 42 comprises, on its face 42i oriented towards the protrusion 23, a groove 421 having a first edge 421a facing the storage volume SV and a second edge 421b provided in the opposite direction, so as to receive the sealing ring 6 sealing under the sealing pressure AD and keep it in position when the outer piece 42 is slid onto the protrusion 23. The groove 421 and the sealing ring 6, e. g. an O ring, are dimensioned such that gaps L1, L2 (see FIG. 3) exist between the sealing ring 6 and the first and second edges 421a, 421b, in which gaps the plastically deformable inner-vessel material can enter so as to form, according to the invention, the first and second sealing beads 24a, 24b (plus the sealing bead 24c, if desired, along the lower face 411u of the sleeve 411), which protrude into these gaps L1 and L2. Furthermore, the two-part sealing cone 41 or the outer piece 42 is formed such that between the storage volume SV and the upper face 230 of the protrusion 23 (the face oriented in the direction of the outer face of the pressure vessel 1) as well as through the sleeve 411 (gas passage GV indicated by dashed line) and the upper face of the clamping cone 412, there is an open gas connection GV towards the storage volume SV. Since the sleeve 411 comprises an outer face 411a oriented towards the protrusion 23 and an opposite inner face 411i, the surface area of the outer face 411a of the sleeve 411, which rests on the protrusion 23, being smaller than its inner face 411i, the interior pressure inside the storage volume SV of the pressure vessel 1 causes the sleeve 411 to be additionally pressed, due to the area ratios, in the direction of the protrusion 23 and thus against the inner face 42i of the outer piece 42. The same applies to the clamping cone 412 which has the same area ratios of outer face 412a and inner face 412i. The groove 421 can have a contour which is adapted to a shape of the sealing ring 6 in the unloaded state (see FIG. 3). The outer layer 3 is applied on the outer face 2a of the inner vessel 2 whereas its inner face 2i defines the storage volume SV. The hollow outer sleeve 411 has a smallest interior diameter DI-411, an exterior diameter DA-411 which is adapted to the diameter of the protrusion D-23 and an accordingly adapted contour which extends beyond the protrusion 23 outwards in the area above the upper face 230 of the protrusion 23 so that the sleeve 411 cannot be slid too far in the direction of the storage volume SV. The inner face 411i of the sleeve 411 is here at least locally concave in the direction of the protrusion 23. This concavity, however, can also be produced by the pressure exerted by the clamping cone. The hollow inner clamping cone 412 has a largest external diameter D-412 that is smaller than an internal diameter D-23 of the protrusion 23 and larger than the smallest internal diameter D-411 of the sleeve 411 and an outer face 412a arranged in the direction of the protrusion 23, the outer face 412a of the clamping cone 412 engaging from the inside with the aid of a positioning aid 7 such that the inner clamping cone 412 is brought into an interference fit with the sleeve 411 and therefore exerts the desired sealing pressure AD against the protrusion 23 and the outer piece 42. FIG. 3 is a schematic view of the sealing concept according to the invention with outer piece 42, protrusion 23 of the pole cap 22 of the inner vessel 2, two-part sealing cone 41 and the formed sealing beads 24a, 24b, 24c. In FIG. 3a, the clamping cone is slid through the protrusion 23 into the storage volume SV of the inner vessel 2 with the aid of a positioning aid 7 and is retained there since its exterior diameter D-412 is smaller than the inner diameter D-23 of the protrusion 23. After this, the sleeve 411 is slid onto the inner face 23i of the protrusion 23 from the outside to form a snug fit, whereas the positioning aid 7 and the clamping cone 412 are not influenced by this (see FIG. 3b). Subsequently, the outer piece 42 is fitted onto the outer face 23a of the protrusion 23, the outer piece 42 comprising, on its face 42i oriented towards the protrusion 23, a suitably shaped groove 421 having a first edge 421a facing the future storage volume SV and a second edge 421b provided in the opposite direction, and a sealing ring 6 that is positioned in the groove 421 and seals under a sealing pressure AD (see FIG. 3c). This does not affect the positioning aid 7 and the clamping cone 412, either. At this point, no sealing beads 24a, 24b, 24c are formed yet, either, since the sealing pressure AD necessary for this is only produced after the clamping cone 412 has been positioned inside the sleeve 411 and thus also in the protrusion 23. After this, the clamping cone 412 is drawn from the inside into the sleeve 411 by means of the positioning aid 7, the outer face 412a of the clamping cone 412 engaging in the inner face 411i of the sleeve 411 to form an anchored interference fit between the two components, creating a sealing pressure AD between two-part sealing cone 41, protrusion 23 and outer piece 42, which pressure leads to formation of the sealing beads 24a, 24b, 24c (see FIG. 3d). The curvature of the inner face 411i of the sleeve 411 beneath the clamping cone 412 prevents a displacement of the clamping cone 412 in the direction of the storage volume SV. The first and the second sealing bead 24a, 24b, together with the conventional seal (O ring to protrusion), form a triple redundancy of sealing of the storage volume SV with respect to the outer face of the pressure vessel 1. In addition, the sleeve 411 and the clamping cone 412 are here dimensioned such that the inner-vessel material additionally forms, due to its plastic deformability, a third bead 24c on the lower face 411u of the sleeve 411, which is directed towards the storage volume SV. This third bead 24c supports the triple redundancy of sealing by retaining the sleeve 411 and thus the entire sealing cone 41 in position, preventing them from sliding or even falling into the inner vessel. Then the positioning aid 7 can be removed from the pressure vessel 1, for instance by folding the strutted lower part of the positioning aid 7, which retains and guides the clamping cone 412, in the direction of the cylinder axis ZA parallel to the cylinder axis ZA by means of a respective mechanism or, in case of a threaded bar, is unscrewed from the respective thread on the inner face of the clamping cone 412. The positioning aid 7 which has thus been made narrower, or which can be unscrewed, can easily be drawn out through the remaining inner opening of the clamping cone 412.

Figure 4:
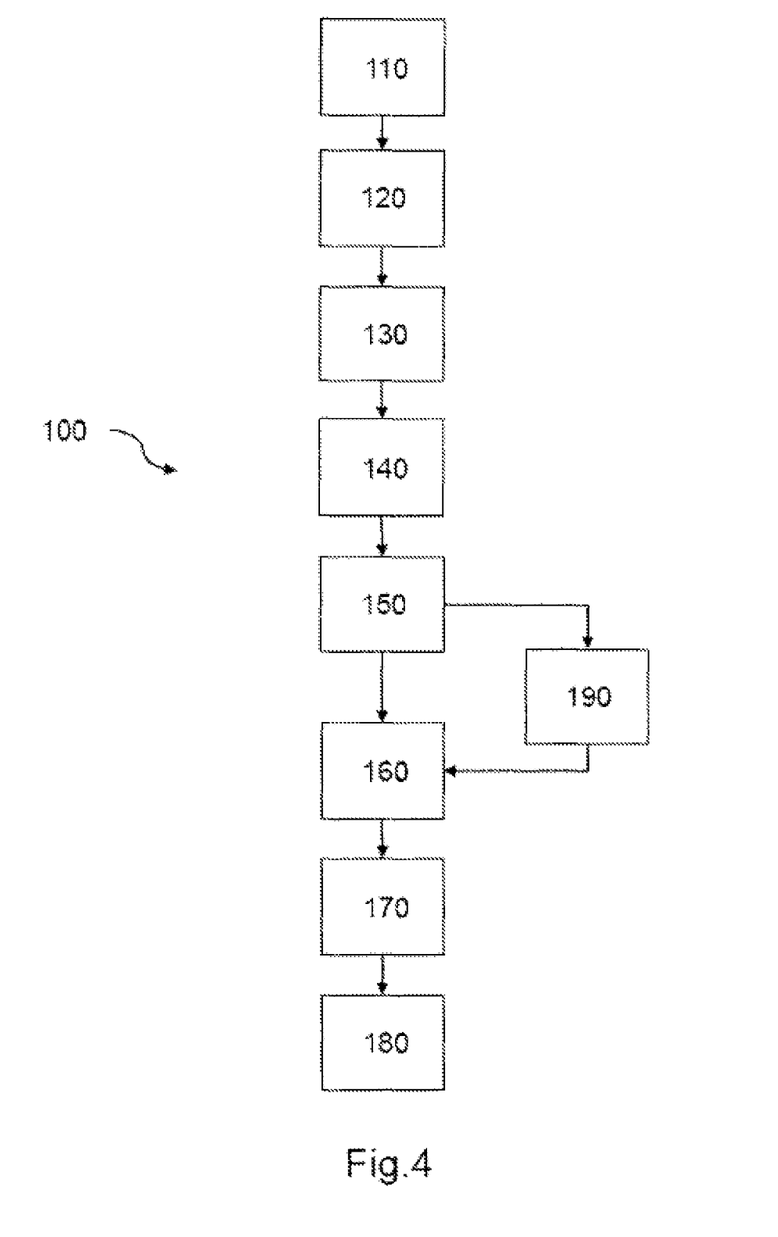
FIG. 4: an embodiment of the method according to the invention for producing the pressure vessel according to the invention.

FIG. 4 shows an embodiment of the method 100 according to the invention for producing the pressure vessel 1 according to the invention, comprising an inner vessel 2 that has an inner and an outer face 2i, 2a and is made of an inner-vessel material that is at least partially plastically deformable under pressure and is designed to receive a valve 5, an outer layer 3 positioned on the inner vessel 2 and a valve-connection piece 4 comprising a two-part sealing cone 41 made up of a hollow outer sleeve 411 and a hollow inner clamping cone 412 as well as an outer piece 42, comprising the following steps: providing 110 the inner vessel 2 with a storage volume SV and an inner, open protrusion 23 that projects cylindrically from the outer face 2a of the inner vessel 2; positioning 120 the clamping cone 412 having a largest external diameter D-412 that is smaller than an internal diameter D-23 of the protrusion 23 and a largest external diameter D-412 that is larger than the smallest internal diameter D-411 of the sleeve 411 towards the protrusion 23 by means of a positioning aid 7, through the protrusion 23, in the storage volume SV of the inner vessel 2; inserting 130 the hollow sleeve of the sealing cone 41 from outside into a tight fit on the inner face 23i of the protrusion 23, the sleeve 411 having a smallest internal diameter D-411 and an external diameter 411a adapted to the protrusion 23, while the positioning aid 7 and the clamping cone 412 are not influenced thereby; fitting 140 the outer piece 42 onto the outer face 23a of the protrusion 23, the outer piece 42 comprising, on its face 42i oriented towards the protrusion 23, a suitably shaped groove 421 having a first edge 421a facing the future storage volume SV and a second edge 421b provided in the opposite direction, and a sealing ring 6 that is positioned in the groove 421 and seals under a sealing pressure AD; positioning 150 the clamping cone 412 by means of the positioning aid 7 from inside in the sleeve 411, the outer face of the clamping cone engaging in the inner face of the sleeve to form an interference fit with the sleeve 411, such that a sealing pressure AD is produced between the two-part sealing cone 41, the protrusion 23 and the outer piece 42; forming 160 at least first and second sealing beads 24a, 24b, which, under the sealing pressure AD and with an accordingly dimensioned groove 421 and sealing ring 6, project into two gaps L1, L2 between the sealing ring 6 and the first and second edge 421a, 421b due to the plastic deformability of the inner-vessel material in order to seal the storage volume from the future inner vessel 2; if desired, forming 190 a third bead 24c around the sleeve 411 on its lower face 41u oriented toward the storage volume SV, due to plastic deformability of the inner-vessel material; producing 170 the outer layer 3 on the inner vessel 2 in order to reinforce the pressure vessel 1; and fitting 180 the valve 5 into the valve-connection piece 4 in order to close the pressure vessel 1. The outer layer 3 may consist of fibre composite material and can be wound onto the inner vessel 2 in the producing step. Here, insertion 130 of the sleeve 411 onto an upper face 23o of the protrusion 23 up to a stop 4111 on the sleeve 411 and/or fitting 140 of the outer piece 42 to the sleeve 411 and/or to the clamping cone 412 until it comes in contact with an inner face 42i of the outer piece 42 can be performed as well. In addition, the inner vessel 2 can be made in one piece.

The embodiments shown here are only examples of the present invention and are therefore not to be intended as limiting. Alternative embodiments considered by the person skilled in the art are equally comprised by the scope of the present invention.

LIST OF REFERENCE NUMERALS

1 pressure vessel according to the invention
2 inner vessel
2i inner face of inner vessel
2a outer face of inner vessel
21 central portion of inner vessel
22 pole caps of inner vessel
23 protrusion of inner vessel
23i inner face of the protrusion
23a outer face of the protrusion
23o upper face of the protrusion
24a first sealing bead
24b second sealing bead
24c third bead
3 outer layer
4 valve-connection piece
41 two-part sealing cone
411 sleeve of sealing cone
411a outer face of sleeve
411i concave inner face of sleeve
411u lower face of sleeve
4111 stop of sleeve on protrusion
412 clamping cone of sealing cone
412a protruding outer face of clamping cone
412i inner face of clamping cone
42 outer piece
42i face oriented towards protrusion (inner face of outer piece)
421 groove
421a first edge
421b second edge
43 securing element
5 valve
6 sealing ring
7 positioning aid
100 a method of producing a pressure vessel according to the invention
110 providing the inner vessel
120 positioning the clamping cone in the storage volume of the inner vessel
130 inserting the hollow sleeve in the protrusion
140 fitting the outer piece onto the protrusion from the outside
150 positioning the clamping cone by means of the positioning aid in the sleeve
160 forming at least first and second sealing beads under the sealing pressure 170 producing the outer layer on the inner vessel
180 fitting the valve into the valve-connection piece
190 forming of third bead
AD sealing pressure
D-23 interior diameter of protrusion
DA-411 exterior diameter of sleeve of the sealing cone
DI-411 smallest interior diameter of sleeve of the sealing cone
D-412 largest exterior diameter of clamping cone
GV gas connection
L1, L2 gaps between first and second edge of the groove, respectively, and the sealing ring
SV storage volume
ZA cylinder axis

The invention claimed is:

1. A pressure vessel comprising an inner vessel that has an inner and an outer face and is made of an inner-vessel material that is at least partially plastically deformable under pressure, for providing a storage volume in the pressure vessel, comprising an outer layer applied on the inner vessel for the reinforcement thereof, and comprising a valve-connection piece arranged on the inner vessel having a two-part hollow sealing cone and outer piece for receiving a valve and for sealing the storage volume from the inner vessel, the inner vessel comprising, for connecting the valve-connection piece, a protrusion that is inwardly open towards the storage volume and projects cylindrically from the outer face of the inner vessel, the sealing cone being positioned on an inner face of the protrusion and the outer piece for generating a sealing pressure between the sealing cone, the protrusion and the outer piece on an outer face of the protrusion, the outer piece comprising, on the face thereof oriented towards the protrusion, a suitably shaped groove having a first edge facing the storage volume and a second edge provided in the opposite direction for receiving a sealing ring that seals under the sealing pressure, the groove and the sealing ring being dimensioned and the inner-vessel material being provided such that, under the sealing pressure and due to the plastic deformability thereof, first and second sealing beads that project at least into two gaps between the sealing ring and the first and second edge are formed, and the two-part sealing cone comprising a hollow outer sleeve having a smallest internal diameter, an external diameter adapted to the protrusion and an inner face that is at least locally concave towards the protrusion, and comprising a hollow inner clamping cone having a largest external diameter that is smaller than an internal diameter of the protrusion and larger than the smallest internal diameter of the sleeve and an outer face that at least locally projects toward the protrusion, wherein the sleeve is positioned on the inner face of the protrusion from outside and the projecting outer face of the clamping cone is positioned from inside with the aid of a positioning aid so as to engage in the concave inner face of the sleeve such that the inner clamping cone is brought in an interference fit with the sleeve.

2. The pressure vessel according to claim 1, characterized in that
the inner vessel is produced in one piece.

3. The pressure vessel according to claim 1, characterized in that
the sleeve is shaped such that it comprises a stop facing an upper face of the protrusion and/or at least partially rests on an inner face of the outer piece extending at least over the sleeve and the protrusion.

4. The pressure vessel according to claim 1, characterized in that
the sleeve is dimensioned such that the inner-vessel material forms, due to its plastic deformability, a third bead around the sleeve on its lower face directed towards the storage volume.

5. The pressure vessel according to claim 1, characterized in that
the two-part sealing cone or the outer piece is formed such that there is an open gas connection towards the storage volume between the storage volume and the upper face of the protrusion.

6. The pressure vessel according to claim 5, characterized in that
the sleeve comprises an outer face that faces the protrusion, the surface area of the outer face of the sleeve resting on the protrusion and/or the outer face of the clamping cone resting on the sleeve being smaller than their respective inner faces.

7. The pressure vessel according to claim 1, characterized in that
the groove has a contour which is adapted to a shape of the sealing ring in the unloaded state.

8. The pressure vessel according to claim 1, characterized in that
the inner-vessel material, at least for the protrusion, is a PA material, a PE material or a multi-layered material made of these materials.

9. The pressure vessel according to claim 1, characterized in that
the valve-connection piece comprises an additional securing element which interconnects the two-part sealing cone and the outer piece.

10. The pressure vessel according to claim 9, characterized in that
the securing element is mounted in the outer piece and comprises a thread, at least on its side facing the two-part sealing cone, which is provided for self-cutting engagement in the sleeve and/or the clamping cone.

11. A method for producing a pressure vessel according to claim 1, comprising an inner vessel that has an inner and an outer face and is made of an inner-vessel material that is at least partially plastically deformable under pressure for receiving a valve, an outer layer positioned on the inner vessel and a valve-connection piece having a two-part sealing cone made up of a hollow outer sleeve and a hollow inner clamping cone, as well as an outer piece, comprising the following steps:
providing the inner vessel with a storage volume and a protrusion that is inwardly open and projects cylindrically from the outer face of the inner vessel the clamping cone having a largest external diameter that is smaller than an internal diameter of the protrusion and a largest external diameter that is larger than the smallest internal diameter of the sleeve towards the protrusion by means of a positioning aid through the protrusion, in the storage volume of the inner vessel;
inserting the hollow sleeve of the sealing cone from outside into a tight fit on the inner face of the protrusion, the sleeve having a smallest internal diameter and an external diameter adapted to the protrusion, while the positioning aid and the clamping cone are not influenced thereby;
fitting the outer piece onto the outer face of the protrusion, the outer piece comprising, on its face oriented towards the protrusion, a suitably shaped groove having a first edge facing the future storage volume and a second edge provided in the opposite direction, and a sealing ring that is positioned in the groove and seals under a sealing pressure;

positioning the clamping cone by means of the positioning aid from inside in the sleeve, the outer face of the clamping cone engaging in the inner face of the sleeve to form an interference fit with the sleeve, such that a sealing pressure is produced between the two-part sealing cone, the protrusion and the outer piece;

forming at least first and second sealing beads, which, under the sealing pressure and with an accordingly dimensioned groove and sealing ring, project into two gaps between the sealing ring and the first and second edge due to the plastic deformability of the inner-vessel material in order to seal the storage volume with respect to the future inner vessel;

producing the outer layer on the inner vessel in order to reinforce the pressure vessel; and fitting the valve into the valve-connection piece in order to close the pressure vessel.

12. The method according to claim 11, comprising the further step of forming a third bead around the sleeve on its lower face directed towards the storage volume due to the plastic deformability of the inner-vessel material.

13. The method according to claim 11, wherein the outer layer consists of fibre composite material and is wound onto the inner vessel in the producing step.

14. The method according to claim 11, wherein the sleeve is inserted onto an upper face of the protrusion up to a stop on the sleeve and/or the outer piece is fitted until contact of an inner face of the outer piece on the sleeve and/or on the clamping cone occurs.

15. The method according to claim 11, wherein the inner vessel is produced in one piece.

* * * * *